United States Patent
Nakashin et al.

(10) Patent No.: US 9,106,844 B2
(45) Date of Patent: *Aug. 11, 2015

(54) IMAGE PROCESSING APPARATUS, IMAGE PROCESSING METHOD, AND PROJECTOR

(71) Applicant: SEIKO EPSON CORPORATION, Tokyo (JP)

(72) Inventors: Yoshitaka Nakashin, Matsumoto (JP); Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,184

(22) Filed: Jul. 8, 2014

(65) Prior Publication Data

US 2014/0320669 A1  Oct. 30, 2014

Related U.S. Application Data

(63) Continuation of application No. 13/785,882, filed on Mar. 5, 2013, now Pat. No. 8,804,054.

(30) Foreign Application Priority Data

Mar. 8, 2012 (JP) ................................ 2012-051910

(51) Int. Cl.
*H04N 3/22* (2006.01)
*H04N 3/26* (2006.01)
*H04N 9/31* (2006.01)
*H04N 17/00* (2006.01)

(52) U.S. Cl.
CPC ............. *H04N 9/317* (2013.01); *H04N 9/3191* (2013.01); *H04N 9/3194* (2013.01); *H04N 17/00* (2013.01)

(58) Field of Classification Search
CPC ......... H04N 3/22; H04N 3/223; H04N 3/227; H04N 3/23; H04N 3/233; H04N 3/2335; H04N 9/317; H04N 9/3191; H04N 9/3194; G03B 21/14; G03B 21/215; G03B 21/142; G03B 21/247
USPC ........... 348/177, 189–191, 745–747; 353/101
See application file for complete search history.

(56) References Cited

U.S. PATENT DOCUMENTS

| | | | |
|---|---|---|---|
| 7,559,658 B2 * | 7/2009 | Kamiya et al. | 353/101 |
| 8,804,054 B2 * | 8/2014 | Nakashin et al. | 348/745 |
| 2005/0195375 A1 | 9/2005 | Fujiwara | |
| 2005/0231820 A1 * | 10/2005 | Miyasaka | 359/686 |
| 2010/0026972 A1 | 2/2010 | Kaneko | |
| 2010/0165168 A1 | 7/2010 | Takahashi | |
| 2011/0292303 A1 * | 12/2011 | Nimura et al. | 348/745 |

FOREIGN PATENT DOCUMENTS

| | | | |
|---|---|---|---|
| JP | 10-161243 A | 6/1998 | |
| JP | 2010-032842 A | 2/2010 | |
| JP | 2012-008522 A | 1/2012 | |

* cited by examiner

*Primary Examiner* — Michael Lee
(74) *Attorney, Agent, or Firm* — Maschoff Brennan

(57) ABSTRACT

A projector that acquires evaluation values representing how well projection light is brought into focus on a screen, outputs the acquired evaluation values and a maximum value of the acquired evaluation values, and updates the maximum value to a new value at a predetermined timing.

7 Claims, 11 Drawing Sheets

FIRST EMBODIMENT

IMAGE PROCESSING APPARATUS, IMAGE PROCESSING METHOD, AND PROJECTOR

CROSS REFERENCES TO RELATED APPLICATIONS

This application is a continuation of U.S. patent application Ser. No. 13/785,882, filed on Mar. 5, 2013, which claims priority to Japanese Patent Application No. 2012-051910 filed Mar. 8, 2012, both of which are expressly incorporated herein by reference.

BACKGROUND

1. Technical Field

The present invention relates to an image processing apparatus, an image processing method, and a projector.

2. Related Art

To bring projection light projected from a projector onto a screen into focus, a user manually operates a focus ring or any other component for focus adjustment in some cases. JP-A-2010-32842, for example, describes a technology used in this case for assisting the user in performing the focus adjustment operation by quantifying how well the projection light is brought into focus.

The technology described in JP-A-2010-32842 is based on a reference point where the projection light is perfectly brought into focus on a projection surface and displays the degree of deviation from the reference point. It is, however, difficult to achieve the best focus by making the manual adjustment in accordance with the degree of change in an evaluation value.

JP-A-10-161243 is exemplified as another related art document.

SUMMARY

An advantage of some aspects of the invention is to provide a technology that allows focus adjustment to be made manually and precisely.

The invention can be implemented as the following forms or application examples:

APPLICATION EXAMPLE 1

This application example is directed to an image processing apparatus including an evaluation value acquisition section that acquires evaluation values representing how well projection light is brought into focus on a projection surface, an output section that outputs the acquired evaluation values and a maximum value of the acquired evaluation values, and an update section that updates the maximum value to a new value at a predetermined timing.

According to the configuration described above, the maximum value is updated to a new value at a predetermined timing, whereby an unexpected maximum value resulting from some reasons is hardly outputted, and a user can therefore precisely perform focus adjustment.

APPLICATION EXAMPLE 2

This application example is directed to the image processing apparatus described in Application Example 1, wherein the update section updates the maximum value after a state in which the acquired evaluation values are smaller than the maximum value has lasted for a predetermined period.

According to the configuration described above, even when an unexpected maximum value resulting from some reasons is outputted, the unexpected maximum value is updated after the state in which the evaluation values are smaller than the maximum value has lasted for a predetermined period, whereby the user can perform focus adjustment in such a way that evaluation values reach an appropriate maximum value.

APPLICATION EXAMPLE 3

This application example is directed to the image processing apparatus described in Application Example 2, wherein the evaluation value acquisition section detects that the evaluation values have increased and then decreased, and the output section starts outputting the maximum value when the evaluation value acquisition section detects that the evaluation values have increased and then decreased.

According to the configuration described above, the maximum value will not be outputted until it is detected that the evaluation values have increased and then decreased. The user therefore keeps performing the focus adjustment until a maximum value is displayed. The configuration prevents the user from performing the focus adjustment based on an erroneous maximum value and finishing the adjustment.

APPLICATION EXAMPLE 4

This application example is directed to the image processing apparatus described in Application Example 2 or 3, wherein the update section updates the maximum value based on a local maximum of the evaluation values in the predetermined period.

According to the configuration described above, when the state in which the evaluation values are smaller than the maximum value has lasted for a predetermined period, the maximum value is updated based on a local maximum of the evaluation values calculated in the predetermined period. A more appropriate maximum value is thus outputted.

APPLICATION EXAMPLE 5

This application example is directed to the image processing apparatus described in Application Example 4, wherein the update section updates the maximum value to a local maximum of the evaluation values in the predetermined period that is acquired at a timing closest to a timing when the predetermined period ends.

According to the configuration described above, when the state in which the evaluation values are smaller than the maximum value has lasted for a predetermined period, the maximum value is updated to the latest local maximum of the evaluation values calculated in the period. A more appropriate maximum value that reflects the current state in which the image processing apparatus is installed is thus outputted.

APPLICATION EXAMPLE 6

This application example is directed to the image processing apparatus described in Application Example 2 or 3, wherein the update section updates the maximum value to an evaluation value acquired at a timing when the predetermined period ends.

According to the configuration described above, the maximum value is updated to the current evaluation value, whereby the user can resume the focus adjustment with reference to the current evaluation value.

The invention can be implemented not only as the image processing apparatus described above but also as an image processing method, a projector including the image processing apparatus, and a computer program. The computer program may be recorded on a computer readable recording medium. Examples of the recording medium may include a flexible disk, a CD-ROM, a DVD-ROM, a magneto-optical disk, a memory card, a hard disk drive, and a variety of other media.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
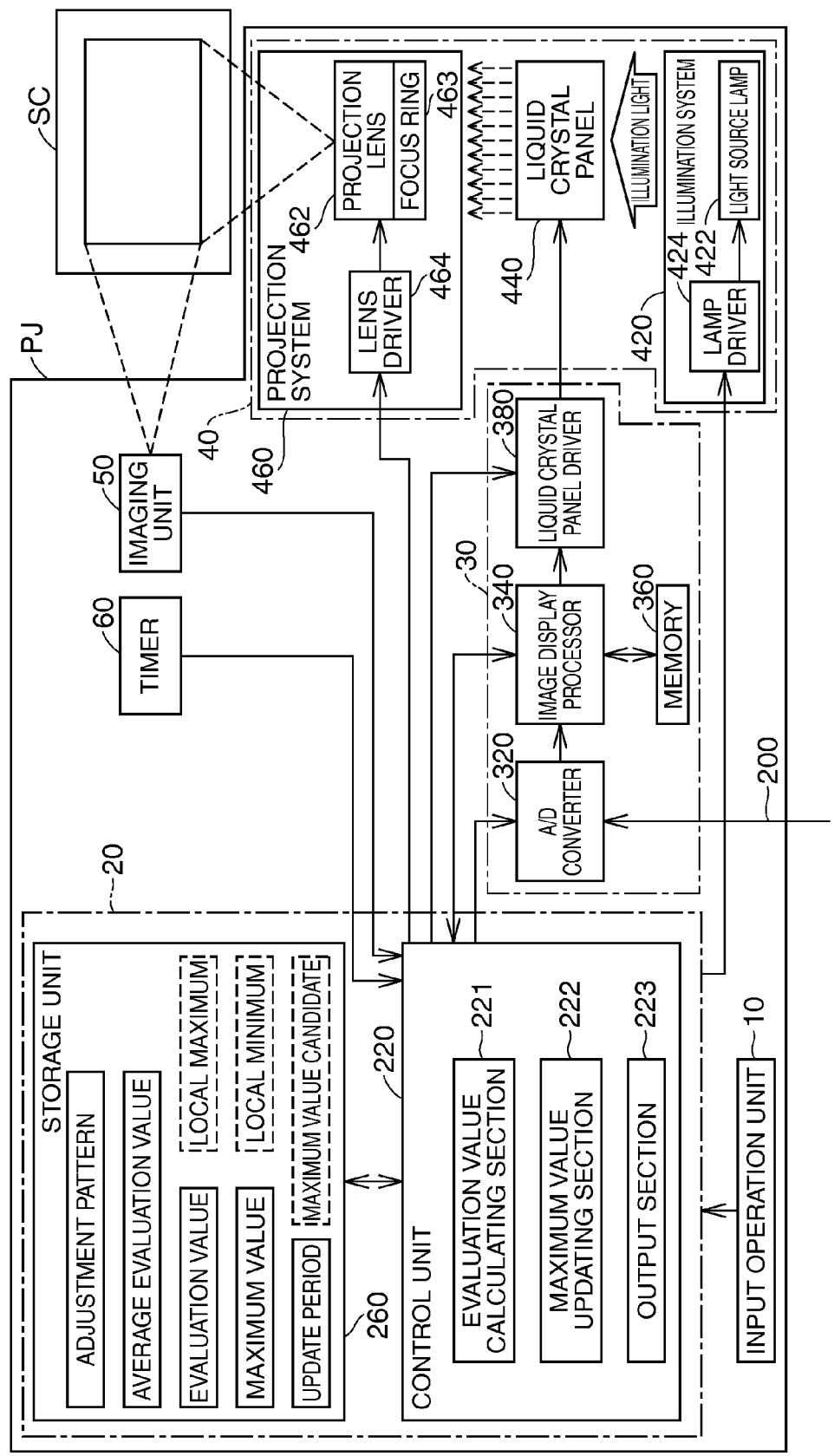
FIG. 1 schematically shows the hardware configuration of a projector.

A1. Configuration of Projector:

FIG. 1 schematically shows the hardware configuration of a projector PJ as an image processing apparatus according to an embodiment of the invention. The projector PJ projects image light representing an image to display the image on a screen SC or any other projection surface.

The projector PJ includes an input operation unit 10, a control circuit 20, an image processing action circuit 30, an image projection system (projection unit) 40, an imaging unit 50, and a timer 60.

The input operation unit 10 is formed of buttons, keys, and other parts provided on a remote control (not shown) and the projector PJ and outputs an instruction according to user's operation to the control circuit 20. An instruction according to user's operation includes, for example, instructions to start and stop an assist process that will be described later.

The image projection system 40 produces image light representing an image and projects the image light to form an enlarged image on the screen SC. The image projection system 40 includes an illumination system 420, a liquid crystal panel 440, and a projection system 460.

The illumination system 420 includes a light source lamp 422 and a lamp driver 424. The light source lamp 422 can be an ultrahigh-pressure mercury lamp, a metal halide lamp, or other discharge-type light source lamps, a light emitting diode, a laser light source, an organic EL (electro luminescence) device, or other various self-luminous devices. The lamp driver 424 drives the light source lamp 422 under the control of the control circuit 20.

The liquid crystal panel 440 is a light modulator that modulates light having exited from the illumination system 420 based on image data. The liquid crystal panel 440 is formed of a transmissive panel in which a plurality of pixels are arranged in a matrix. The liquid crystal panel 440 modulates illumination light having radiated from the illumination system 420 into image light representing an image based on a drive signal from a liquid crystal panel driver 380 in the image processing action circuit 30, which will be described later.

The projection system 460 projects the image light having exited from the liquid crystal panel 440 onto the screen SC to form an enlarged image on the screen SC. The projection system 460 includes a projection lens 462 and a lens driver 464. The projection lens 462 includes a plurality of lenses (not shown) and a focus ring 463 that moves the point where the projection light is brought into focus. When the focus ring 463 is rotated, the position of a lens accommodated in the projection lens 462 and mechanically connected to the focus ring 463 is so changed that the point where the projection light is brought into focus moves. The position where the projection light is brought into focus on the projection surface is thus adjusted.

The image processing action circuit 30 includes an analog/digital converter (A/D converter) 320, an image display processor 340, and the liquid crystal panel driver 380. The A/D converter 320 performs A/D conversion under the control of the control circuit 20 on an input image signal inputted from an image supply apparatus (not shown), such as a DVD player and a PC (personal computer), through a cable 200 and writes the resultant digital image signal to a memory 360. The image display processor 340 performs various types of image processing, such as keystone correction and image display state adjustment (for example, adjustment of brightness, contrast, synchronization, tracking, color depth, and tint), when the digital image signal written to the memory 360 (hereinafter referred to as "input image") is read. The liquid crystal panel driver 380 drives the liquid crystal panel 440 in accordance with the digital image signal inputted from the image display processor 340.

The imaging unit 50 includes a CCD camera and captures and acquires a variety of images. An image captured by the imaging unit 50 is hereinafter also referred to as a "captured image." A captured image acquired by the imaging unit 50 is stored in a storage unit 260. The CCD camera in the imaging unit 50 may be replaced with any other device capable of capturing an image, such as a CMOS camera.

The timer 60 is used in an assist process that will be described later to measure a period based on which whether or not a maximum value is updated and whether or not a focus adjustment assist process is terminated are determined.

The control circuit 20 is a computer including a CPU, a ROM, and a RAM and executes a control program to function as a control unit 220 and the storage unit 260.

The control unit 220 includes an evaluation value calculating section 221, a maximum value updating section 222, and an output section 223. The storage unit 260 stores information for various types of control. In the present embodiment, the storage unit 260 stores an adjustment pattern, evaluation values, an average evaluation value, a maximum value, and an update period based on which the maximum value is updated. The values described above will be described later in detail.

The evaluation value calculating section 221 analyzes, based on a known method, an adjustment pattern contained in an adjustment image (which will be described later) captured by the imaging unit 50 and calculates an evaluation value representing how well the focus is achieved on the projection surface. The evaluation value calculating section 221 further calculates and acquires the average of five calculated evaluation values (average evaluation value). The evaluation value calculating section 221 stores the evaluation values and the average evaluation value in the storage unit 260. An evaluation value can be calculated, for example, by using the method described in JP-A-2010-32842. The evaluation value calculating section 221 corresponds to an "evaluation value acquisition section" in the present application.

The output section 223 reads the calculated average evaluation value and the maximum value from the storage unit 260 and produces an image containing graphed average evaluation value and maximum value. The output section 223 further reads the adjustment pattern stored in the storage unit 260, produces an adjustment image containing the adjustment pattern, the average evaluation value, the maximum value, and the graphed average evaluation value and maximum value, and outputs the adjustment image to the image display processor 340.

Figure 2:
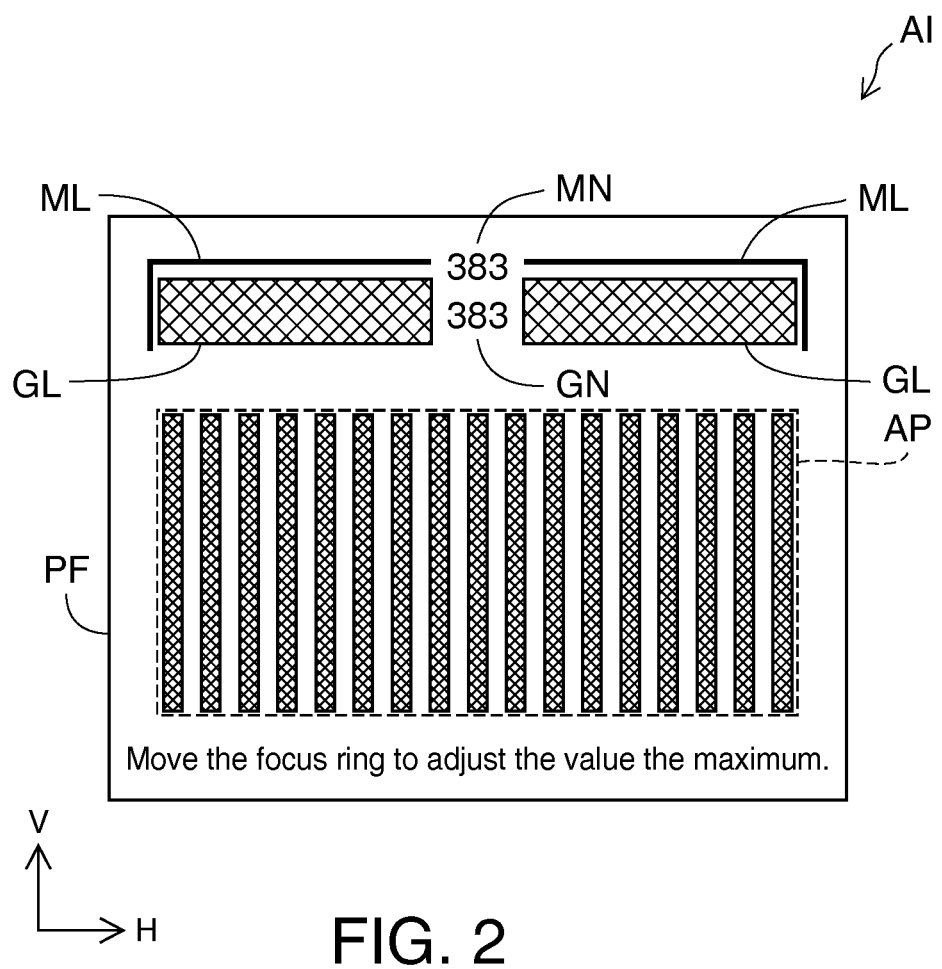
FIG. 2 shows an example of an adjustment image.

FIG. 2 shows an example of an adjustment image AI. The adjustment image AI shown in FIG. 2 contains a pattern area AP, an average evaluation value GN, a maximum value MN, an average evaluation value graph GL, and a maximum value graph ML displayed within a panel frame PF of the liquid crystal panel 440. The pattern area AP contains a rectangular pattern that has a dark area (hatched area) and a bright area (non-hatched area) alternately arranged along a horizontal direction H, and the pattern itself extends in a vertical direction V, which is perpendicular to the horizontal direction H. The dark areas are colored black, and the bright areas are colored white. It is noted that when the storage unit 260 stores no average evaluation value or maximum value, the adjustment image AI shows only the pattern area AP. A user carries out a focus adjustment process that will be described later in such a way that the average evaluation value GN contained in the adjustment image AI reaches the maximum value MN.

The maximum value updating section 222 can force update of the maximum value stored in the storage unit 260 at a predetermined timing. The maximum value is a largest calculated average evaluation value. The maximum value is an evaluation value that represents a preferable focus state in an environment in which the projector PJ is currently installed. In the present embodiment, the maximum value updating section 222 updates the maximum value after a state in which the average evaluation value is smaller than the maximum value has lasted for a fixed period.

Figure 3:
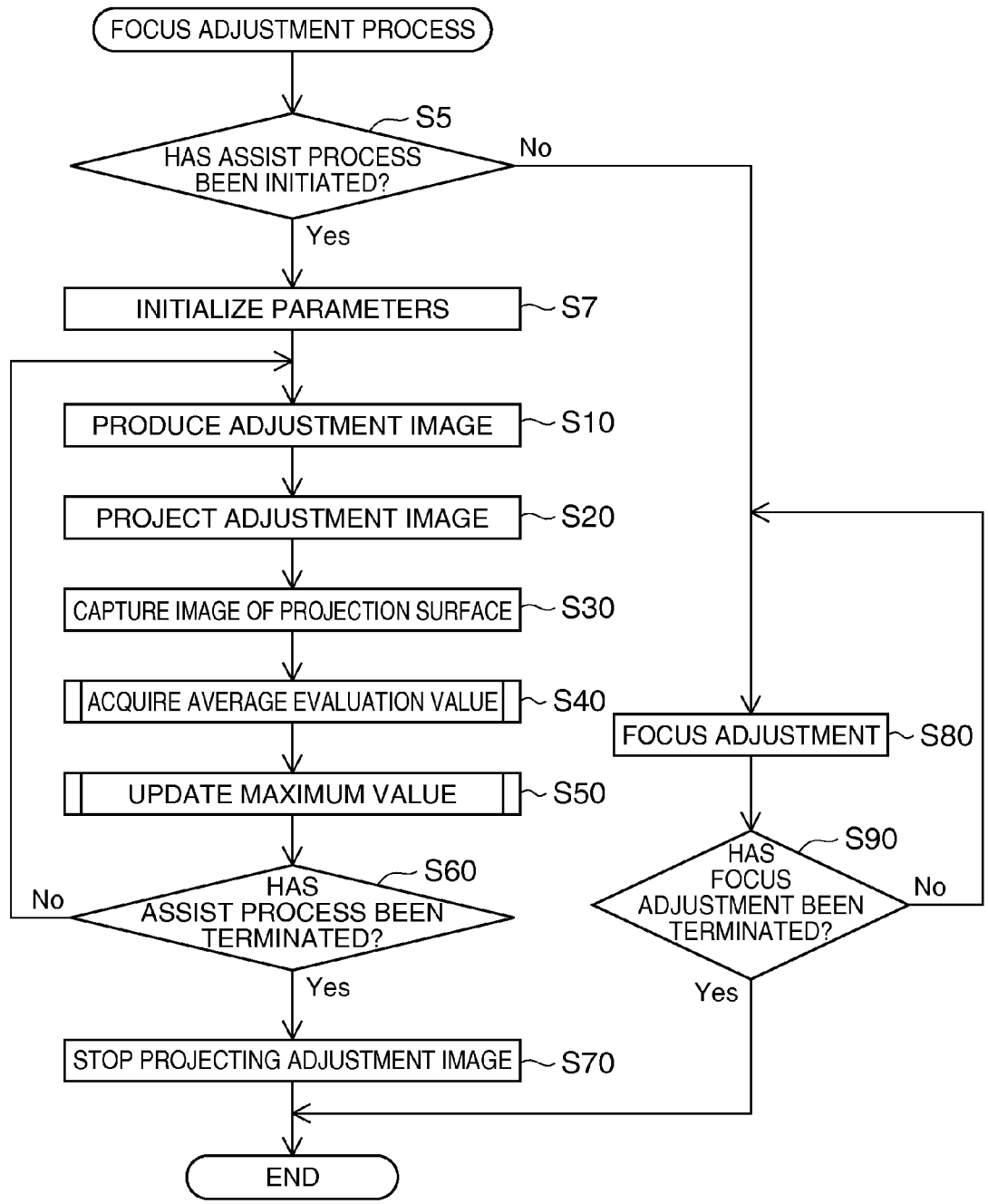
FIG. 3 is a flowchart showing a focus adjustment process.

A2. Focus Adjustment Process:

FIG. 3 is a flowchart showing the focus adjustment process. The focus adjustment process is a process of operating the focus ring 463 to adjust how well the projection light is brought into focus on the projection surface (screen SC). The focus adjustment process is initiated in response to an instruction from the user via the remote control after the projector PJ is installed. The focus adjustment process may be automatically initiated, for example, in response to user's operation of a power-on switch or the focus ring 463.

When the focus adjustment process is initiated, the control unit 220 determines whether or not the user has operated a predetermined menu screen or an operation button to choose initiation of the assist process (step S5). The assist process is a process of displaying the adjustment image AI on the screen SC to assist the user who is carrying out the focus adjustment process.

Having determined that initiation of the assist process has been chosen (step S5: Yes), the control unit 220 initializes the parameters stored in the storage unit 260 (step S7). In the first embodiment, the evaluation values, the average evaluation value, and the maximum value stored in the storage unit 260 are initialized (step S7).

The output section 223 reads the adjustment pattern, the average evaluation value, and the maximum value from the storage unit 260 and produces the adjustment image AI shown in FIG. 2 (step S10).

The output section 223 then outputs the produced adjustment image AI to the image display processor 340. The adjustment image AI is outputted via the liquid crystal panel driver 380 to the image projection system 40, which projects the adjustment image AI on the screen SC (step S20). After the adjustment image AI is projected, the imaging unit 50 captures an image of the adjustment image AI (step S30). The captured adjustment image AI is stored in the storage unit 260.

After an image of the adjustment image AI is captured, the evaluation value calculating section 221 calculates and acquires an average evaluation value based on the result of analysis of the captured image (step S40), and the maximum value updating section 222 carries out a process of updating the maximum value (step S50). The calculation of an average evaluation value and the update of the maximum value will be described later in detail.

After the user stops operating the focus ring 463 and a predetermined update period (10 seconds, for example) elapses, the output section 223 determines that termination of the assist process has been chosen (step S60: Yes) and stops projecting the adjustment image AI (step S70). On the other hand, when the user keeps operating the focus ring 463 (step S60: No), the control returns to step S10, and the assist process is carried out again.

When initiation of the assist process is not chosen in step S5 (step S5: No), the user can operate the focus ring 463 to manually carry out focus adjustment without using the adjustment image AI in such a way that the currently projected input image is brought into focus. When the user then stops operating the focus ring 463 and the predetermined period elapses as in step S60, the output section 223 determines that termination of the focus adjustment process is chosen (step S90: Yes) and terminates the focus adjustment process. That is, the assist process in the present embodiment can be carried out in combination with the normal focus adjustment (focus adjustment carried out by the user without using the assist process).

Figure 4:
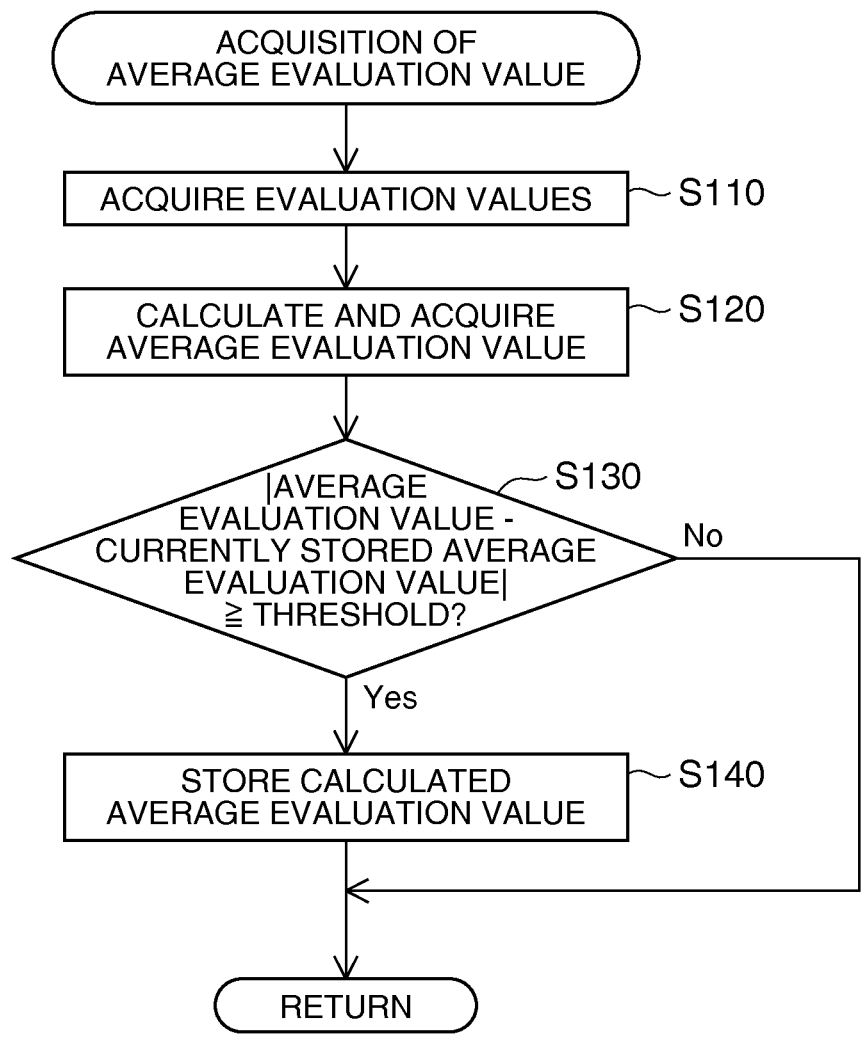
FIG. 4 is a flowchart for describing acquisition of an average evaluation value.

A3. Acquisition of Average Evaluation Value:

FIG. 4 is a flowchart for describing the acquisition of an average evaluation value in step S40 described above. First, the evaluation value calculating section 221 analyzes the captured image of the adjustment image AI to acquire evaluation values (step S110). The acquired evaluation values, up to five, are stored in a FIFO area (not shown) in the storage unit 260 in the present embodiment.

The evaluation value calculating section 221 then calculates the average of the five evaluation values stored in the FIFO area, that is, carries out a running average of the evaluation values five times, to acquire an average evaluation value (step S120).

Having calculated and acquired an average evaluation value, the evaluation value calculating section 221 calculates the difference between the average evaluation value acquired in step S120 and the average evaluation value currently stored in the storage unit 260 and determines whether or not the absolute value of the difference is greater than or equal to a threshold (step S130).

When the absolute value of the difference between the average evaluation value acquired in step S120 and the currently stored average evaluation value is greater than or equal to the threshold (step S130: Yes), the evaluation value calculating section 221 rounds off the average evaluation value calculated in step S120 based, for example, on counting fractions over ½ as one and disregarding the rest and stores the rounded value in the storage unit 260 (step S140). When the difference is smaller than the threshold (step S130: No), the evaluation value calculating section 221 does not store the calculated average evaluation value, and the control proceeds to the next step in the assist process.

The reason why an average evaluation value is calculated and acquired as described above is as follows: An average evaluation value displayed in an adjustment image projected on the screen SC is a value obtained by carrying out running averaging of evaluation values and rounding off the first digit to the right of the decimal. In this case, for example, when the average evaluation value changes between "114.4" and "114.5," the displayed average evaluation value varies between "114" and "115" many times although the real average evaluation value changes only by 0.1. The variation bothers the user who is performing the focus adjustment in some cases. In the present embodiment, however, the difference between the average evaluation value acquired in step S120 and the average evaluation value currently stored in the storage unit 260 is calculated and the acquired average evaluation value is stored only when the absolute value of the difference is greater than a predetermined threshold, whereby the average evaluation value displayed in the adjustment image will not vary quickly. The user can therefore readily perform the focus adjustment while checking the average evaluation value and the maximum value in the adjustment image.

Figure 5:
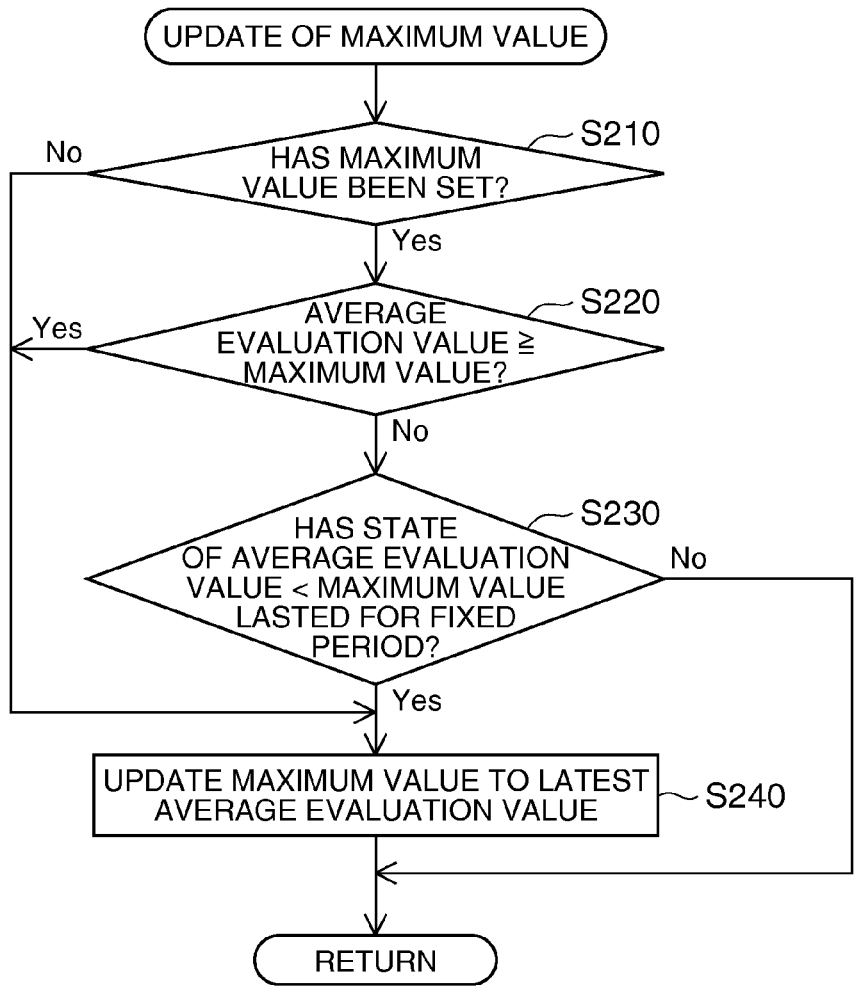
FIG. 5 is a flowchart for describing update of a maximum value.

A4. Update of Maximum Value:

FIG. 5 is a flowchart for describing the update of the maximum value. Having acquired an average evaluation value (step S40 in FIG. 3), the maximum value updating section 222 updates the maximum value (step S50 in FIG. 3).

The maximum value updating section 222 first determines whether or not any maximum value has been set (step S210). When no maximum value has been set, that is, immediately after the initialization (step S210: No), the maximum value updating section 222 sets the maximum value at the value of the average evaluation value (step S240).

Figure 6:
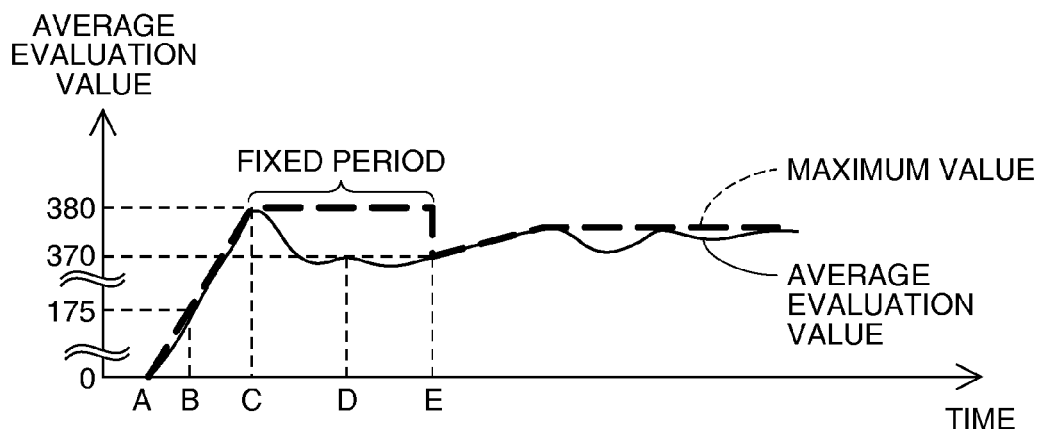
FIG. 6 schematically shows the relationship between the average evaluation value and the maximum value.

FIG. 6 schematically shows the relationship between the average evaluation value and the maximum value. In FIG. 6, in which the horizontal axis represents time and the vertical axis represents the average evaluation value, the solid line represents acquired average evaluation values, and the thick broken line represents maximum values. The case where no maximum value has been set (step S210: No) corresponds, for example, to the period before time A shown in FIG. 6.

On the other hand, when the maximum value has been set at a certain value (step S210: Yes), the maximum value updating section 222 determines whether or not the acquired average evaluation value is greater than or equal to the currently set maximum value (step S220). When the acquired average evaluation value is greater than or equal to the currently set maximum value (step S220: Yes), the maximum value updating section 222 updates the currently set maximum value to the latest average evaluation value (step S240). The case where the acquired average evaluation value is greater than or equal to the currently set maximum value corresponds, for example, to the period from the time A to time C in FIG. 6.

Figure 7:
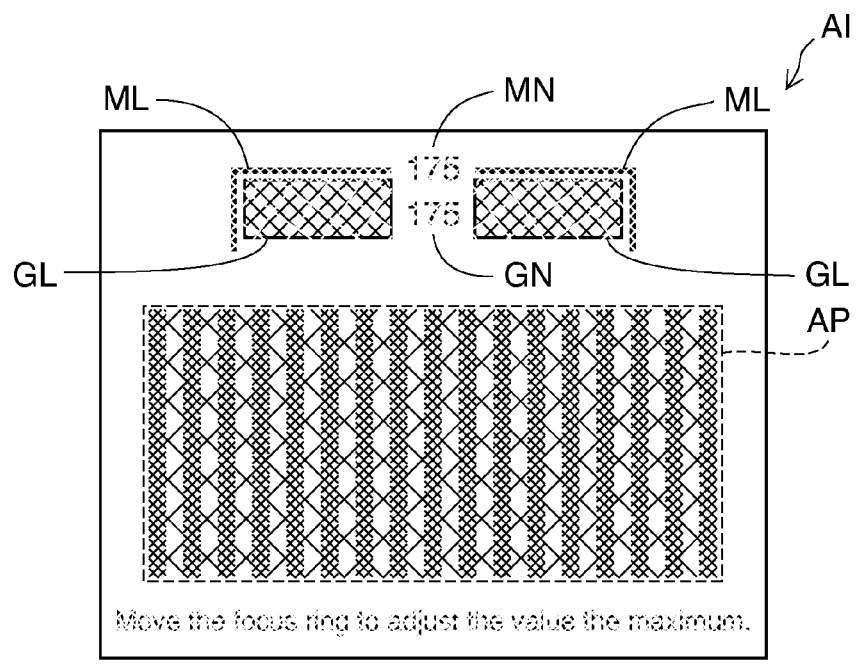
FIG. 7 shows an adjustment image at time B in FIG. 6.

FIG. 7 shows an adjustment image AI projected on the screen SC at time B in FIG. 6. At the time B, image light has not yet been brought into focus, and the entire adjustment image including the pattern area AP is blurred, as shown in FIG. 7. During the period from the time A to the time C, the average evaluation value GN and the maximum value MN increase as the pattern area AP shown in FIG. 7 is gradually brought into focus, and the maximum value graph ML and the average evaluation value graph GL extend in the horizontal direction H accordingly. When the time C is reached, where the average evaluation value is maximized, a focused adjustment image AI, such as the image shown in FIG. 2, is displayed on the screen SC.

When the acquired average evaluation value is smaller than the currently set maximum value (step S220: No), the maximum value updating section 222 determines whether or not the state (step S220: No) has lasted for a predetermined fixed period, for example, for 5 or 10 seconds, based on the value of the timer 60 (step S230). The case where the acquired average evaluation value is smaller than the currently set maximum value corresponds, for example, to the period from the time C to time E in FIG. 6.

Figure 8:
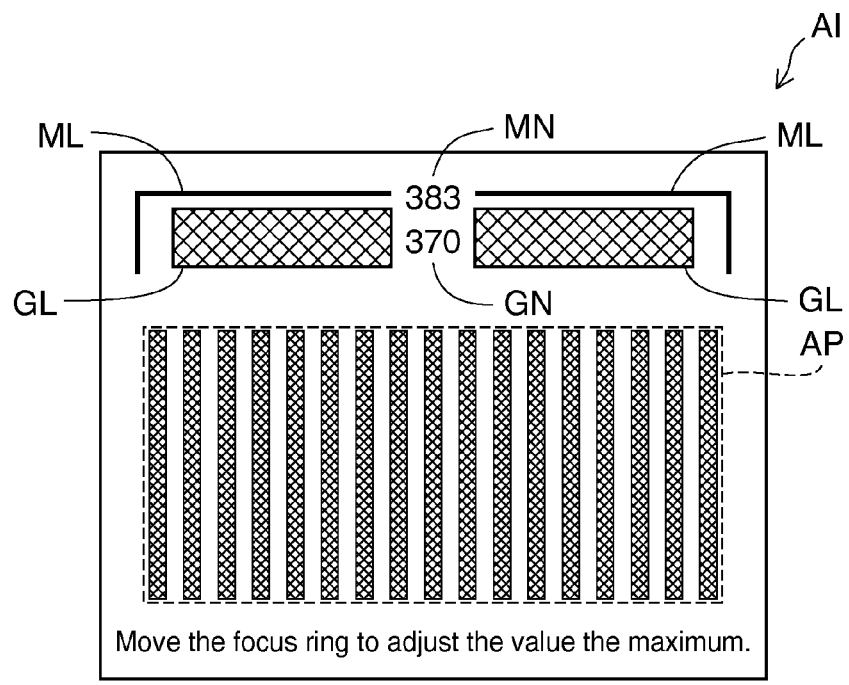
FIG. 8 shows an adjustment image at time D in FIG. 6.

FIG. 8 shows an adjustment image AI at time D in FIG. 6. At the time D, the maximum value MN displayed in the adjustment image AI is "383", whereas the average evaluation value GN is "370", indicating that the average evaluation value is smaller than the maximum value. The user checks the values and graphs displayed in the adjustment image AI and operates the focusing ring 463 in such a way that the average evaluation value GN reaches the maximum value MN to bring the pattern area AP into focus.

When the state in which the acquired average evaluation value is smaller than the currently set maximum value has lasted for the fixed period (step S230: Yes), the maximum value updating section 222 updates the maximum value to the latest average evaluation value (step S240). The case where the state in which the acquired average evaluation value is smaller than the currently set maximum value has lasted for the fixed period corresponds to the state at the time E in FIG. 6.

Figure 9:
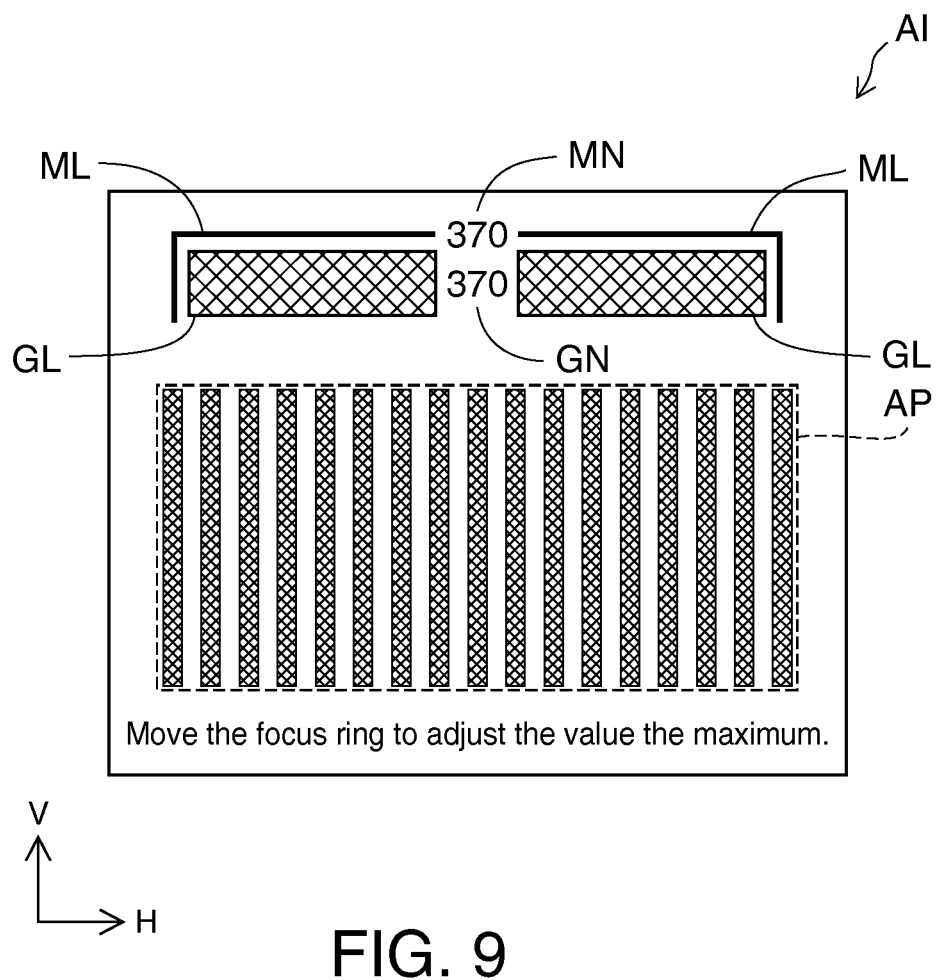
FIG. 9 shows an adjustment image at time E in FIG. 6.

FIG. 9 shows an adjustment image AI at the time E in FIG. 6. At the time E, the maximum value MN is forced to be updated to "370", which is the latest average evaluation value at this point of time. On the other hand, when the state in which the acquired average evaluation value is smaller than the currently set maximum value has not lasted for the fixed period (from time C to time D) (step S230: No), the maximum value updating section 222 does not update the maximum value, and the output section 223 keeps outputting the current maximum value.

Updating the maximum value as described above can handle a situation in which a large average evaluation value is temporarily acquired due to a change in the environment, for example, when the screen SC is deformed, and the maximum value is updated to the temporarily large average evaluation value (FIG. 8). Thereafter, when the state in which the average evaluation value is smaller than the maximum value lasts for the fixed period, the maximum value is updated to an average evaluation value calculated after the fixed period (FIG. 9). As a result, a maximum value updated to a large value due to noise or any other factor will not be displayed for a long time, whereby the user can manually perform the focus adjustment with precision.

B. Second Embodiment

In the first embodiment described above, when an average evaluation value is acquired (step S40 in FIG. 3) but no maximum value has been set (step S210 in FIG. 5: No), the maximum value is set at the value of the latest average evaluation value (step S240 in FIG. 5). In a second embodiment, however, the maximum value is updated when the average evaluation value increases, reaches the maximum value, and then decreases. The configuration of the projector PJ in the present embodiment is the same as that in the first embodiment, but the maximum value update process in the focus adjustment process differs from that in the first embodiment. Further, the storage unit 260 stores not only evaluation values, an average evaluation value, and a maximum value but also a local minimum, a local maximum, and a maximum value candidate. A local minimum is a smallest average evaluation value calculated in a certain period. A local maximum is a greatest average evaluation value calculated in the period. A maximum value candidate is a local maximum average evaluation value acquired in the period.

Figure 10:
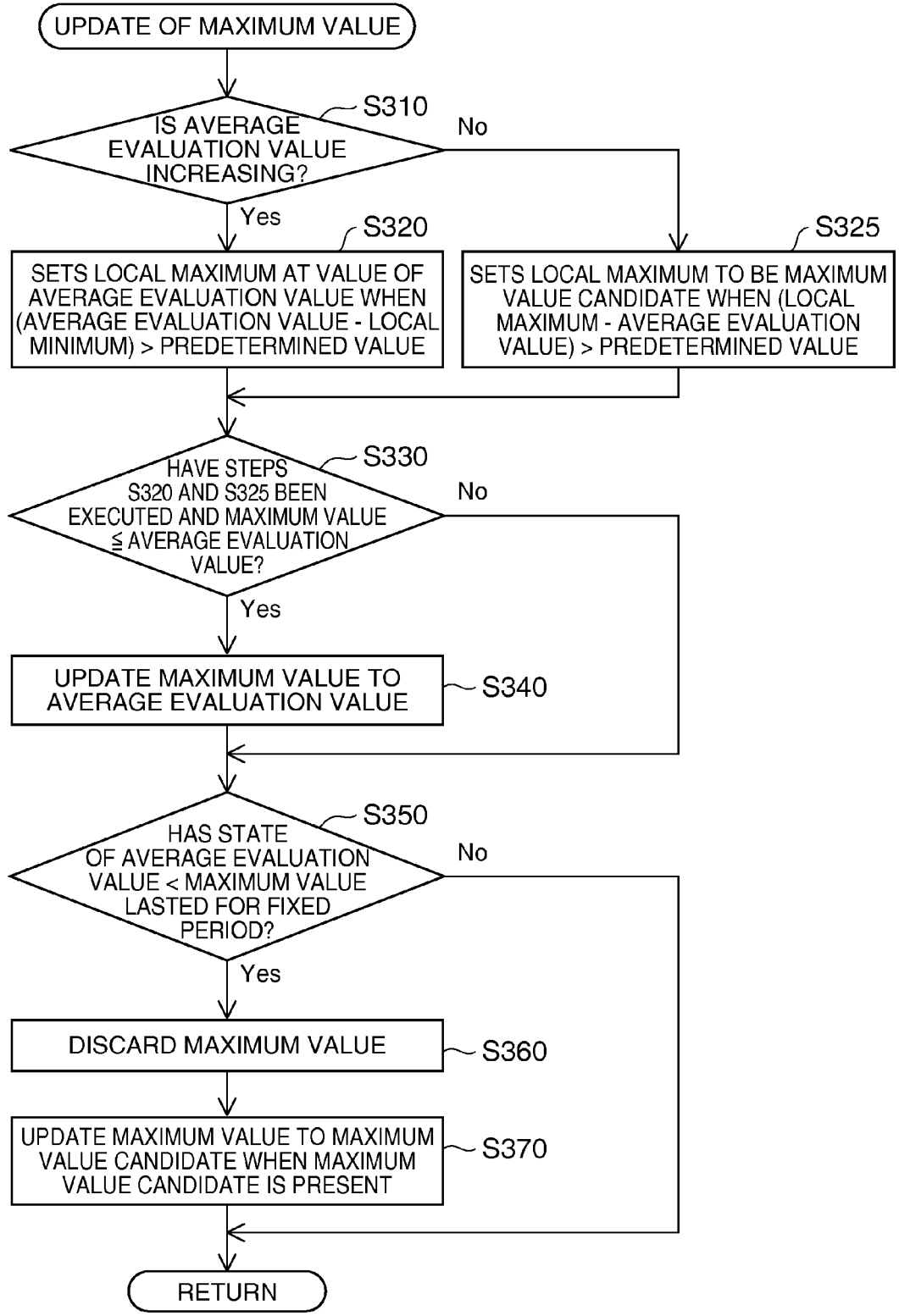
FIG. 10 is a flowchart for describing a maximum value update process in a second embodiment.

FIG. 10 is a flowchart for describing a maximum value update process in the second embodiment. In the present embodiment, a local minimum, a local maximum, a maximum value, and a maximum value candidate are initialized in step S7 in the focus adjustment process shown in FIG. 3. The same processes as those in step S10 to S40 in FIG. 3 are then carried out to calculate an average evaluation value, as in the first embodiment.

Figure 11A:
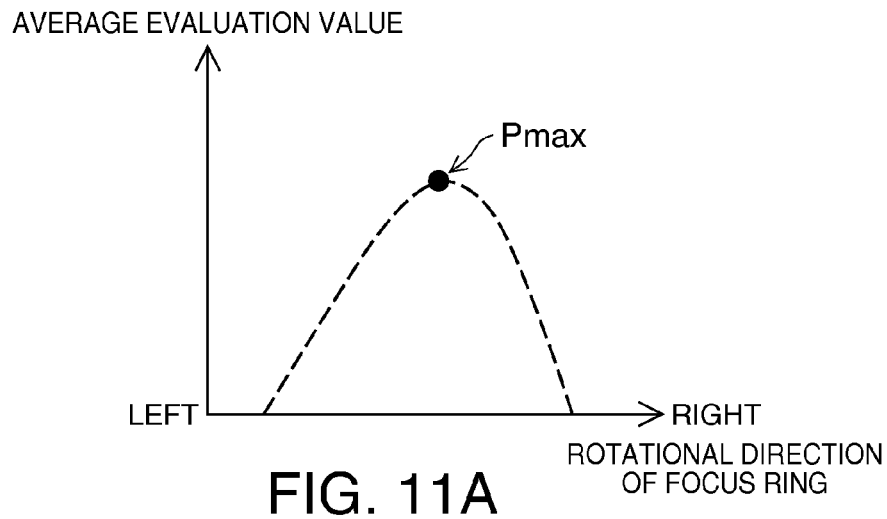
FIGS. 11A to 11C show the relationship between the focus adjustment and the average evaluation value.
Figure 11B:
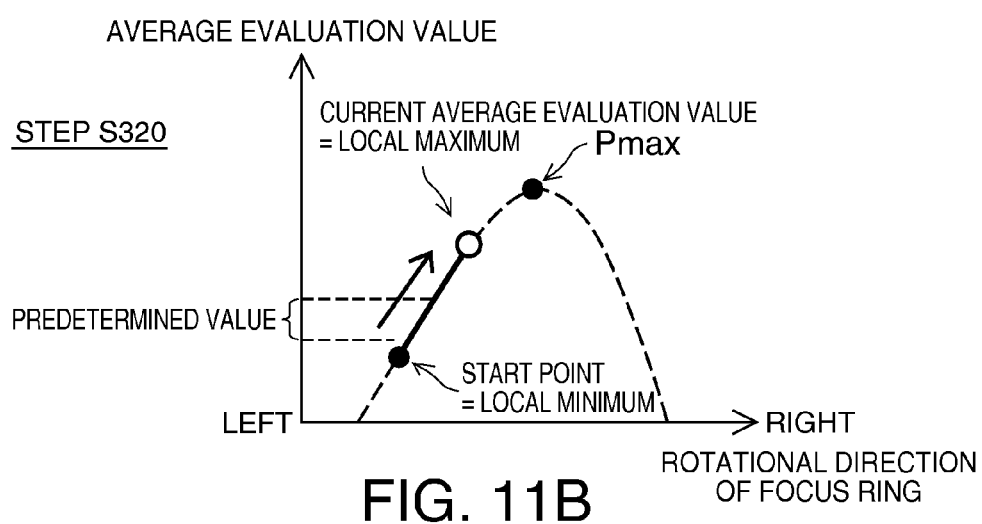
Figure 11C:
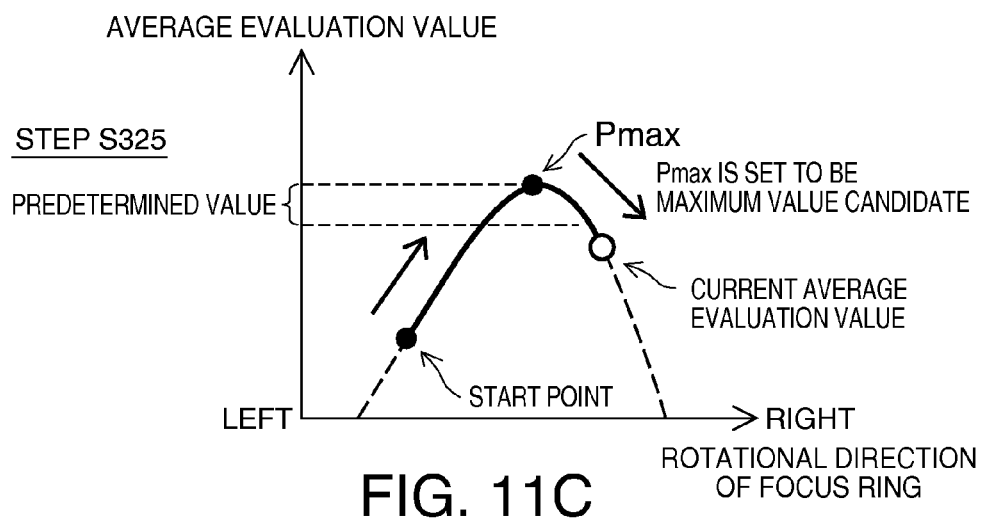

In the present embodiment, after the average evaluation value is calculated, the evaluation value calculating section 221 refers to the average evaluation value stored in the storage unit 260 and determines whether or not the acquired average evaluation value is increasing (step S310), as shown in FIG. 10. FIGS. 11A to 11C show the relationship between the focus adjustment and the average evaluation value. In FIGS. 11A to 11C, the horizontal axis represents the rotational direction of the focus ring 463, and the vertical axis represents the average evaluation value. When the focus ring 463 is moved to a Pmax position shown in FIG. 11A, the best focus is achieved on the screen SC. The situation in which the average evaluation value is increasing means that the average evaluation value is changing toward Pmax.

When the evaluation value calculating section 221 determines that the average evaluation value is increasing (step S310: Yes), and a value obtained by subtracting the local minimum from the average evaluation value is greater than a predetermined value, the evaluation value calculating section 221 sets the local maximum at the value of the current average evaluation value (step S320). A specific description will be made with reference to FIG. 11B. In FIG. 11B, the solid line represents change in the average evaluation value, and an open circle represents the current average evaluation value. When the user rotates the focus ring 463 rightward from a start point (local minimum) shown in FIG. 11B, the difference between the latest average evaluation value and the local minimum becomes greater than the predetermined value. In this case, the current average evaluation value shown in FIG. 11B is set to be a local maximum. When the user keeps rotating the focus ring 463 rightward, the local maximum keeps increasing to the average evaluation value in the Pmax position.

On the other hand, when the evaluation value calculating section 221 determines that the average evaluation value is decreasing (step S310: No), and a value obtained by subtracting the average evaluation value from the local maximum stored in the storage unit 260 is greater than the predetermined value, the evaluation value calculating section 221 sets the local maximum to be the maximum value candidate (step S325). The maximum value candidate is a value to be used when the maximum value is forced to be updated to a new value in step S370, which will be described later. A specific description will be made with reference to FIG. 11C. In FIG. 11C, the solid line represents change in the average evaluation value, and an open circle represents the current average evaluation value. When the user rotates the focus ring rightward from a start point shown in FIG. 11C, the average evaluation value increases to the average evaluation value in the Pmax position. In this case, the average evaluation value in the Pmax position shown in FIG. 11C is set to be the local maximum. When the user further keeps rotating the focus ring rightward, the average evaluation value decreases, and a value obtained by subtracting the current average evaluation value from the average evaluation value in the Pmax position becomes greater than the predetermined value. At this point, the average evaluation value in the Pmax position shown in FIG. 11C, that is, the local maximum is set to be the maximum value candidate. That is, a local minimum average evaluation value and a local maximum average evaluation value are acquired by executing steps S320 and S325, and a maximum value candidate is acquired when a value obtained by subtracting the current average evaluation value from the local maximum becomes greater than the predetermined value. The maximum value candidate is therefore determined after the average evaluation value passes through the local maximum.

Figure 12:
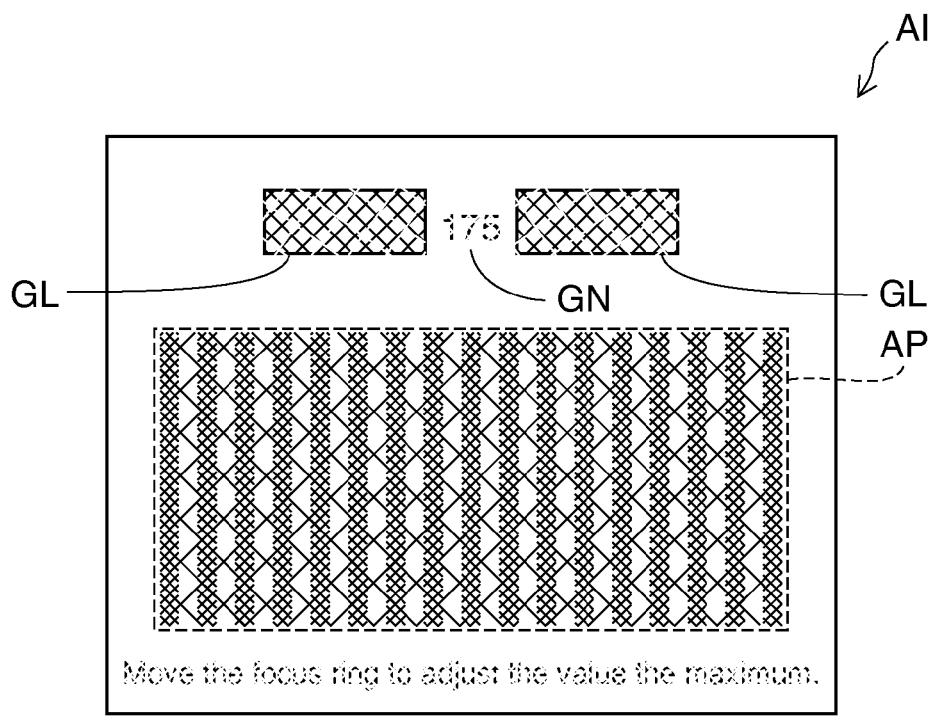
FIG. 12 shows an example of the adjustment image displayed in the course of execution of step S320 or S325.
Figure 12:
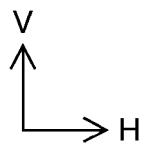

FIG. 12 shows an example of the adjustment image AI displayed in the course of execution of step S320 or S325. In step S320 or S325, no maximum value has been set because the maximum value has been initialized in step S7 in FIG. 3. Only the average evaluation value GN and the average evaluation value graph GL are therefore displayed in the adjustment image AI, as shown in FIG. 12.

The maximum value updating section 222 determines whether or not steps S320 and S325 have been executed and the acquired average evaluation value is greater than or equal to the maximum value (step S330). When step S320 or S325 has not been executed or when the average evaluation value is smaller than the maximum value, the control proceeds to the process in step S350, which will be described later.

When steps S320 and S325 have been executed and the average evaluation value is greater than or equal to the maximum value (step S330: Yes), the maximum value updating section 222 updates the maximum value to the average evaluation value (step S340). An adjustment image AI containing the maximum value MN and the maximum value graph ML, such as the image shown in FIG. 2, is then displayed.

The maximum value updating section 222 then determines whether or not the state in which the average evaluation value is smaller than the maximum value has lasted for a fixed period (step S350), as in step S230 in FIG. 5. When the state has lasted for the fixed period (step S350: Yes), the maximum value updating section 222 discards the current maximum value (step S360) and updates the maximum value to the maximum value candidate acquired in step S325 (step S370).

On the other hand, when the state in which the average evaluation value is smaller than the maximum value has not lasted for the fixed period (step S350: No), the control returns to step S10 in the assist process in FIG. 3, and the processes in step S10 to S60 are carried out.

Figure 13:
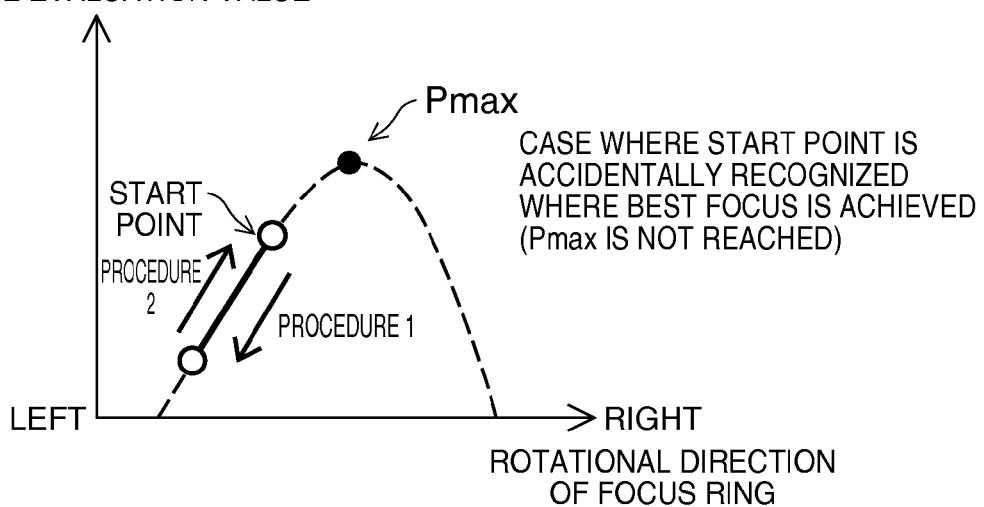
FIG. 13 shows the relationship between the focus adjustment and the average evaluation value in a case where the maximum value update process in the second embodiment is not carried out.

FIG. 13 shows the relationship between the focus adjustment and the average evaluation value in a case where the maximum value update process in the second embodiment is not carried out. In FIG. 13, in which the horizontal axis represents the rotational direction of the focus ring 463 and the vertical axis represents the average evaluation value, the solid line represents change in the average evaluation value. When the focus ring 463 is moved to a Pmax position shown in FIG. 13, the best focus is achieved on the screen SC. Suppose now, for example, that the user starts the focus adjustment at a start point shown in FIG. 13 and erroneously rotates the focus ring 463 in the direction in which image light is not brought into focus (leftward) (procedure 1 in FIG. 13). In this case, even when the user resumes the focus adjustment by rotating the focus ring 463 rightward, the user may accidentally determine that the best focus is achieved when the start point is reached (procedure 2 in FIG. 13). In the present embodiment, however, the maximum value is not updated unless steps S320 and S325 are executed and a value obtained by subtracting the average evaluation value from the acquired local maximum becomes greater than a predetermined value (step S330), and an adjustment image AI with no maximum value displayed, such as the image shown in FIG. 12, is displayed on the screen SC. A maximum value is displayed only when the average evaluation value passes through Pmax (local maximum) as shown in FIG. 11C. The user can therefore appropriately perform the focus adjustment without erroneously recognizing the start point in FIG. 13 as a maximum value.

Further, in the maximum value update process in the first embodiment, when the state in which the average evaluation value is smaller than the maximum value has lasted for a fixed period, the maximum value is updated to the latest average evaluation value (step S240 in FIG. 5), whereas in the present embodiment, the maximum value is updated to a maximum value candidate, which is the latest local maximum (step S370 in FIG. 10). Therefore, even when the current average evaluation value greatly decreases, the user can precisely perform the focus adjustment by checking the latest maximum value (local maximum) as a guide.

C. Variations

A variety of embodiments of the invention have been described above, but the invention is not limited thereto and a variety of other configurations can be employed to the extent that they do not depart from the substance of the invention.

Figure 14:
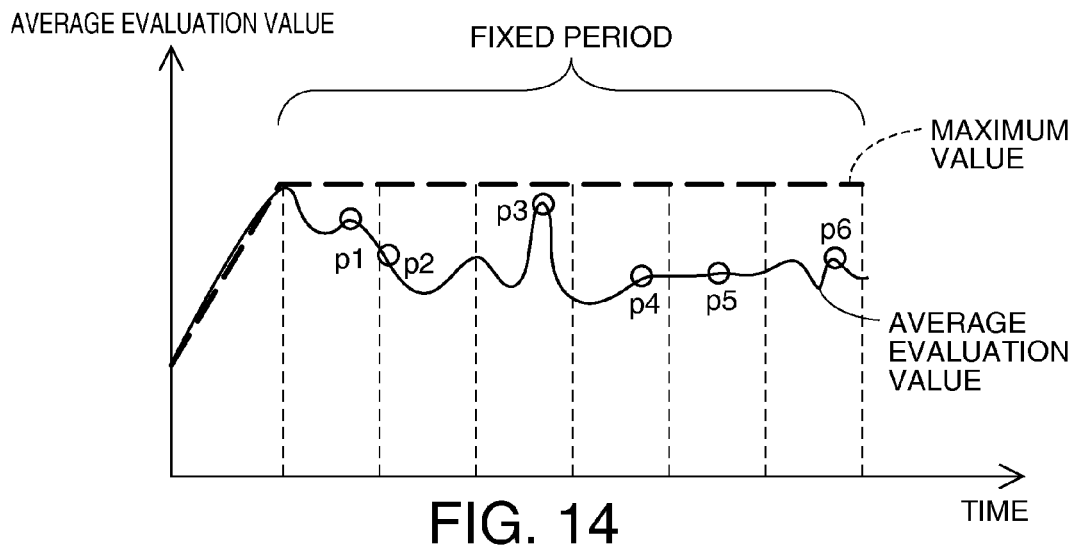
FIG. 14 shows another example of how to calculate a maximum value.

C1. Variation 1:

In the maximum value update process in the first embodiment described above, the maximum value is updated to the current average evaluation value after the state in which the average evaluation value is smaller than the maximum value has lasted for a fixed period, whereas in the second embodiment, the maximum value is updated to a maximum value candidate. The maximum value can alternatively be updated to any other suitable value. FIG. 14 shows another example how to calculate a maximum value. In FIG. 14, in which the horizontal axis represents time and the vertical axis represents the average evaluation value, the solid line represents a history of the average evaluation value, and the thick broken line represents a history of the maximum value. The history of the average evaluation value can be stored in the storage unit 260. For example, a fixed period is divided into a plurality of periods, and a local maximum average evaluation value is acquired in each of the divided periods, as shown in FIG. 14. In FIG. 14, P1 to P6 correspond to local maximums within the divided periods. The maximum value updating section 222 may then update the maximum value to the average of the local maximums or to a local maximum in the period closest to the timing after the fixed period has elapsed (P6). The fixed period can, of course, be divided into an arbitrary number of periods. Further, the maximum value updating section 222 may discard the maximum value after the state in which the average evaluation value is smaller than the maximum value has lasted for a fixed period.

Figure 15:
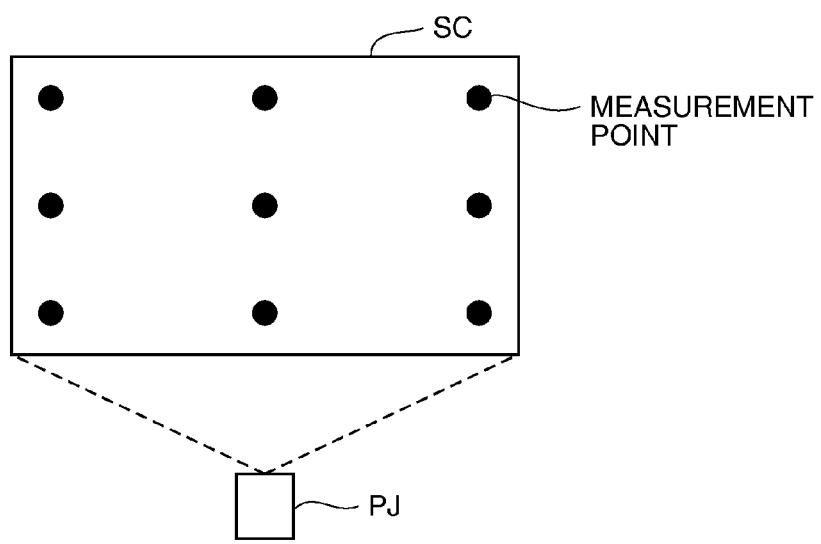
FIG. 15 schematically shows a method for evaluating the degree of overlap between projection light fluxes from a plurality of projectors.
Figure 16:
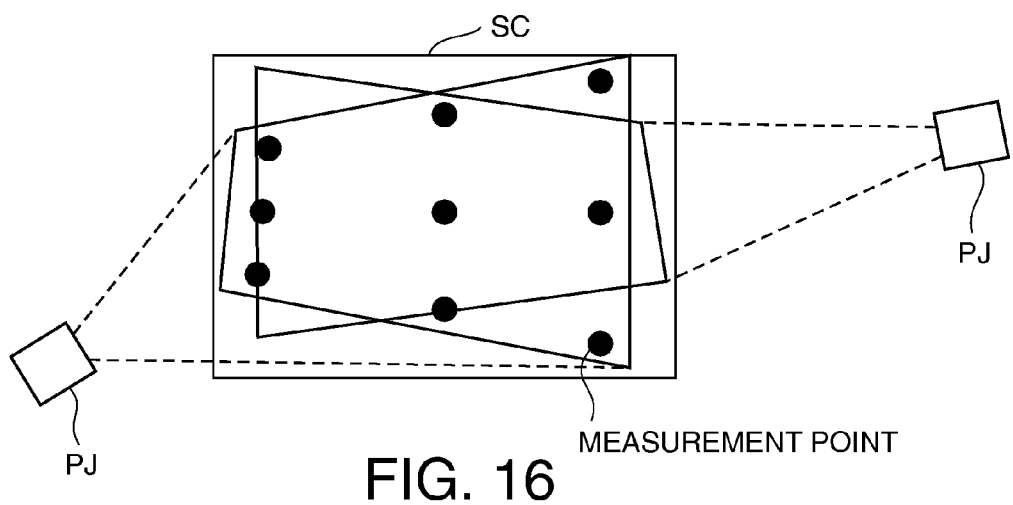
FIG. 16 schematically shows the method for evaluating the degree of overlap between projection light fluxes from a plurality of projectors.

C2. Variation 2:

FIGS. 15 and 16 schematically show a method for evaluating the degree of overlap between projection light fluxes from a plurality of projectors PJ each of which is the projector PJ according to any of the embodiments described above. Two of the projectors PJ described above are used to each project an adjustment pattern containing measurement points, such as the pattern shown in FIG. 15, toward the screen SC, as shown in FIG. 16. The sum of brightness values at the measurement points is calculated instead of calculating evaluation values in the first embodiment. At this point, an average evaluation value, a maximum value, an average evaluation value graph, and a maximum value graph are displayed in an adjustment pattern, although not shown in FIG. 15 or 16. The user can thus know whether or not the degree of overlap between the projection light fluxes from the two projectors PJ has reached a maximum value by checking the average evaluation value, the maximum value, and the graphs thereof, whereby the positions of the two projectors PJ and other parameters can be readily adjusted.

C3. Variation 3:

In the embodiments described above, a rectangular pattern, such as the pattern shown in FIG. 2, is used as the adjustment pattern, but the adjustment pattern is not limited thereto. The adjustment pattern only needs to be a pattern that allows image analysis to be made and evaluation values to be calculated.

C4. Variation 4:

In the embodiments described above, the evaluation value calculating section 221 calculates and acquires evaluation values. Alternatively, a functional unit or circuit that calculates evaluation values may be separately provided, and the evaluation value calculating section 221 may acquire the calculated evaluation values.

C5. Variation 5:

The above embodiments have been described with reference to the case where the projector PJ uses a transmissive liquid crystal panel as a light modulator, but the light modulator is not limited to the transmissive liquid crystal panel 440. For example, a digital micro-mirror device (DMD), a reflective liquid crystal panel, or any other suitable component may be used as the light modulator to modulate the light from the illumination system 420. Still alternatively, the projector PJ may be a CRT projector that projects video images displayed on a small CRT (cathode ray tube) onto a projection surface.

C6. Variation 6:

In the embodiments described above, the image processing apparatus according to any of the embodiments of the invention is used as a projector. Alternatively, the control unit 220 shown in FIG. 1 can be considered as the image processing apparatus. Further, in the embodiments described above, the control unit 220 carries out the assist process on a software basis. Alternatively, the assist process may be carried out on a hardware basis.

C7. Variation 7:

In the variety of embodiments described above, the "average evaluation value," which is the average of five "evaluation values" calculated by the evaluation value calculating section 221, is used to carry out the focus adjustment process and the maximum value update process. Alternatively, the processes may be carried out by using the "evaluation values" instead of the "average evaluation value." Further, the "evaluation values" instead of the "average evaluation value" may be displayed in the adjustment image AI.

What is claimed is:

1. A projector comprising:
   a projection unit that projects projection light;
   a focus adjustment section that makes focus adjustment based on an operation of a user;
   an evaluation value acquisition section that acquires evaluation values representing how well projection light is brought into focus on a projection surface;
   a control section that causes the projection unit to project an evaluation image when the focus adjustment section makes the focus adjustment, the evaluation image representing a correlation between the evaluation value which is newly acquired and a maximum value of the evaluation values which are acquired before; and
   an update section that updates the maximum value to a new value at a predetermined timing in a state in which the acquired evaluation values are smaller than the maximum value.

2. The projector according to claim 1, further comprising:
   an imaging unit that captures an image projected on the projection surface, wherein the evaluation value acquisition section acquires the evaluation values based on the image captured by the imaging unit.

3. The projector according to claim 1,
   wherein the update section updates the maximum value after the state in which the acquired evaluation values are smaller than the maximum value has lasted for a predetermined period.

4. The projector according to claim 3,
   wherein the update section updates the maximum value based on a local maximum of the evaluation values in the predetermined period.

5. The projector according to claim 4,
   wherein the update section updates the maximum value to a local maximum of the evaluation values in the predetermined period that is acquired at a timing closest to a timing when the predetermined period ends.

6. The projector according to claim 3,
   wherein the update section updates the maximum value to an evaluation value acquired at a timing when the predetermined period ends.

7. A control method for a projector that projects projection light, comprising:
   making focus adjustment based on an operation of a user;
   acquiring evaluation values representing how well projection light is brought into focus on a projection surface;
   causing the projector to project an evaluation image when the focus adjustment is made, the evaluation image representing a correlation between the evaluation value which is newly acquired and a maximum value of the evaluation values which are acquired before; and
   updating the maximum value to a new value at a predetermined timing in a state in which the acquired evaluation values are smaller than the maximum value.

* * * * *